Aug. 11, 1964  D. B. CARROLL  3,144,224
ESCAPE HATCHES FOR PASSENGER AIRLINER
Filed Sept. 28, 1962  4 Sheets-Sheet 1
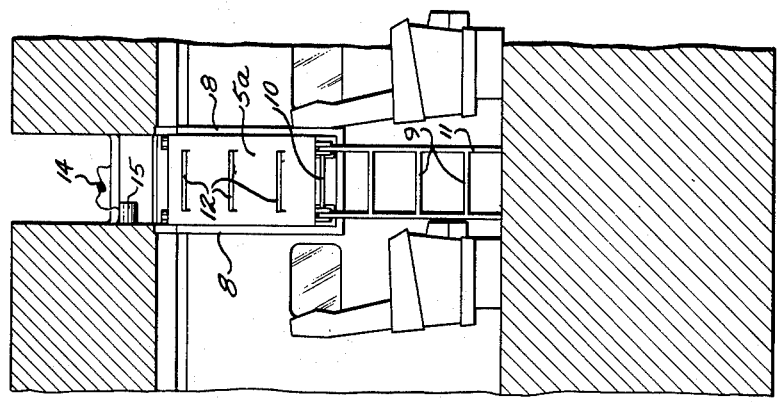
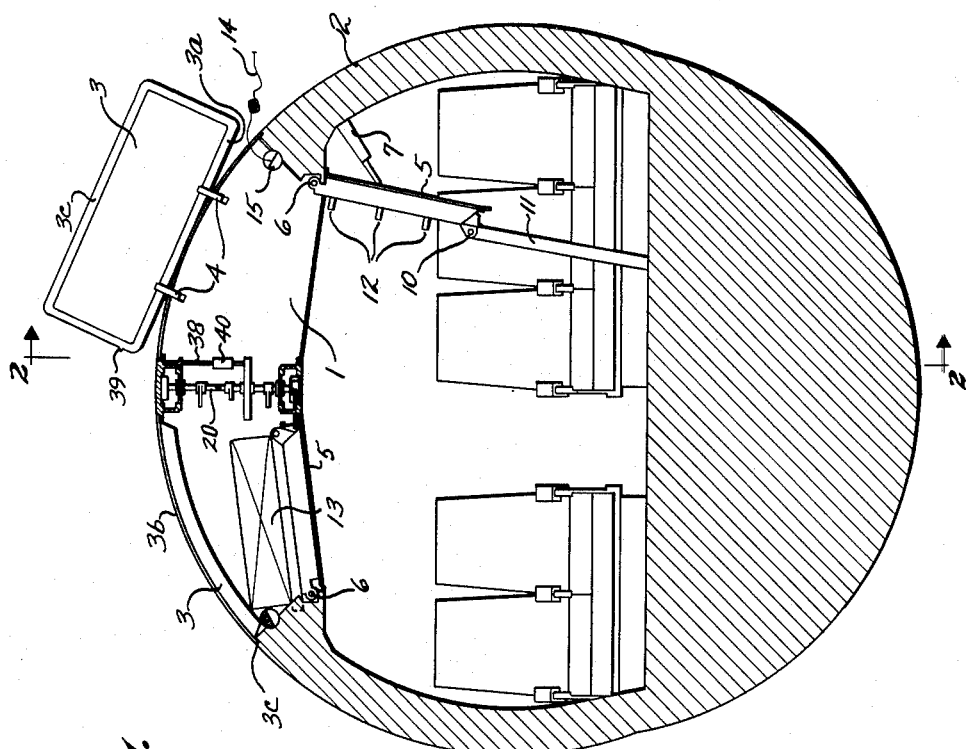
INVENTOR.
DEE B. CARROLL
BY
*Robert W. Beach*
ATTORNEY

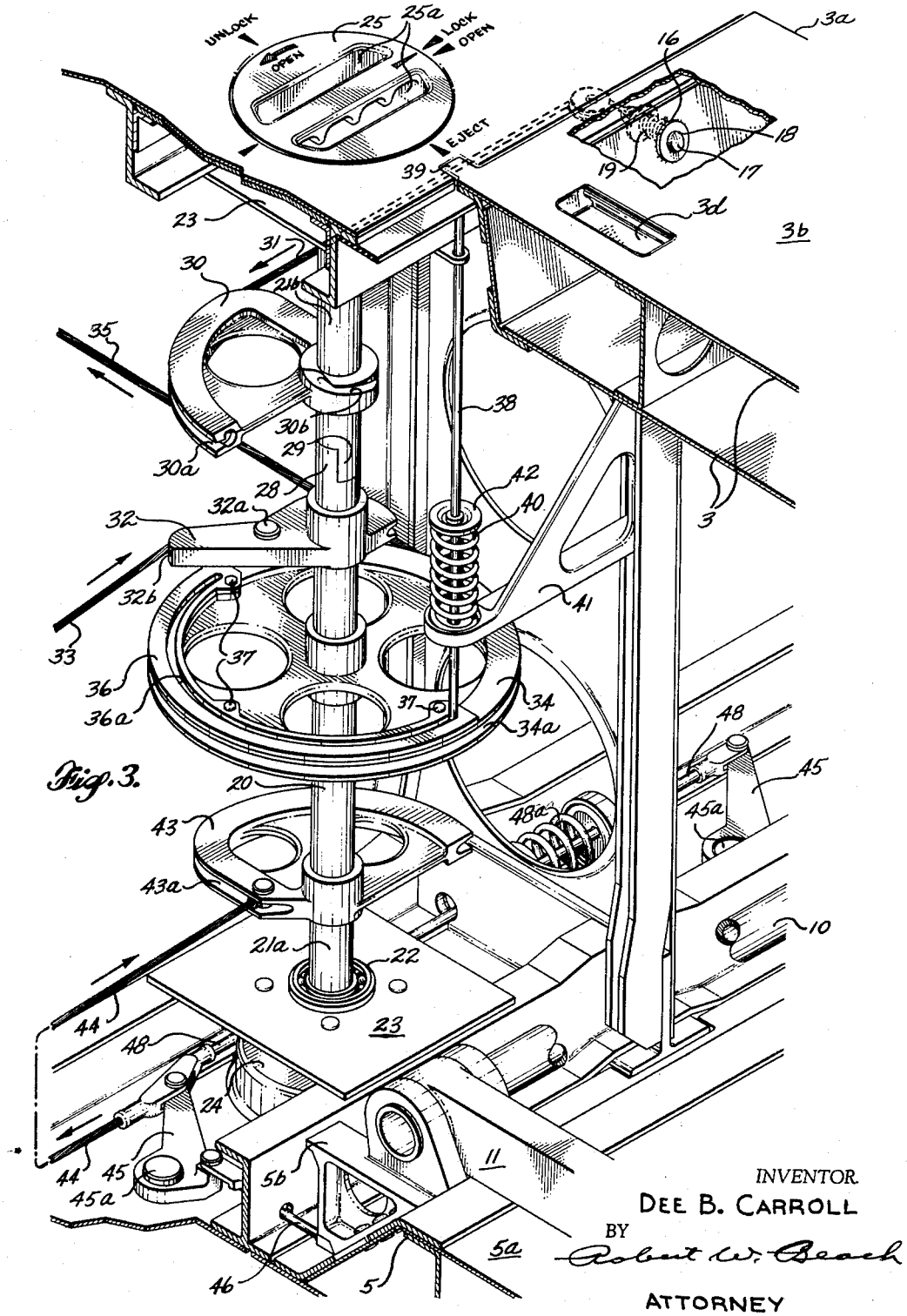

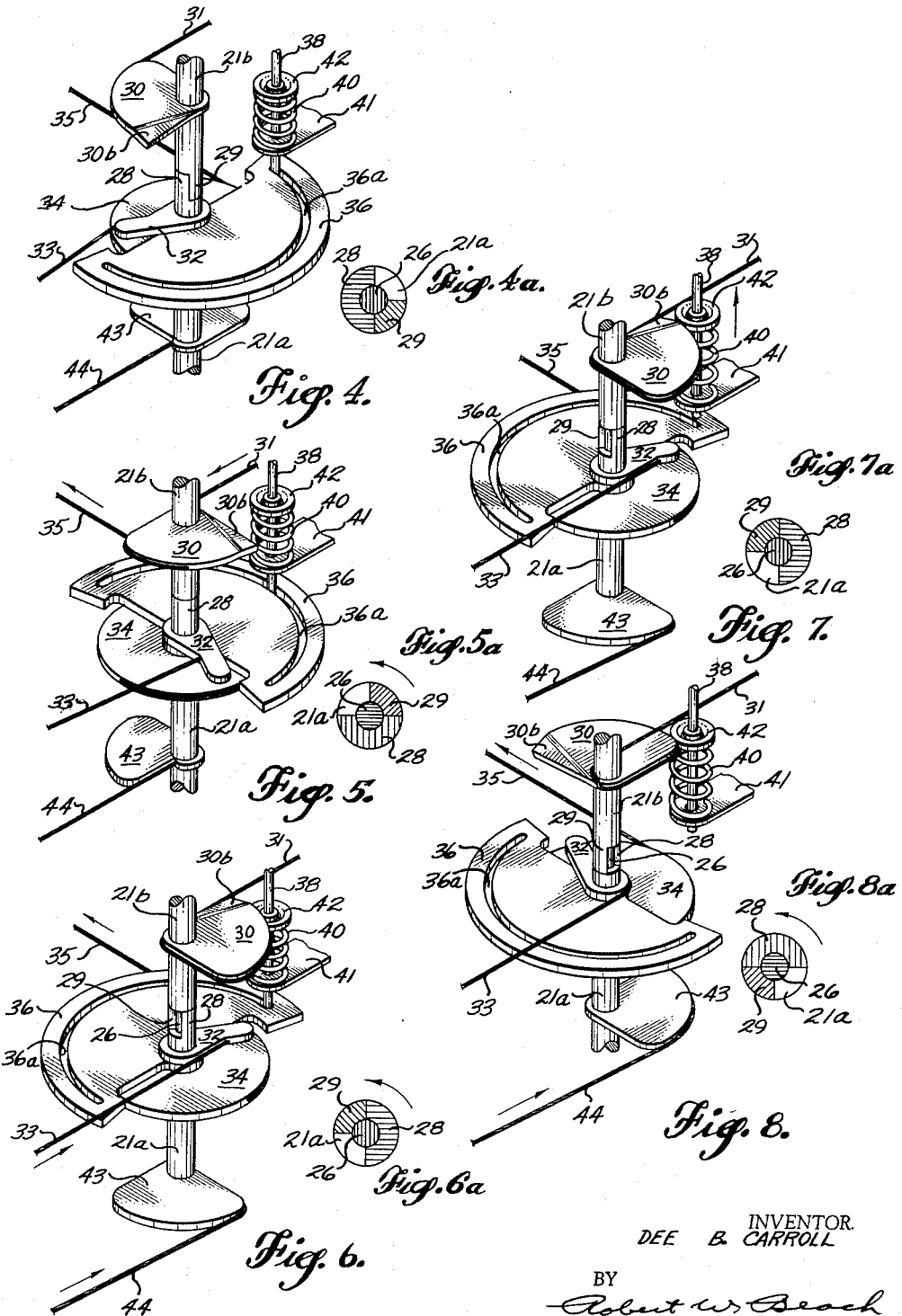

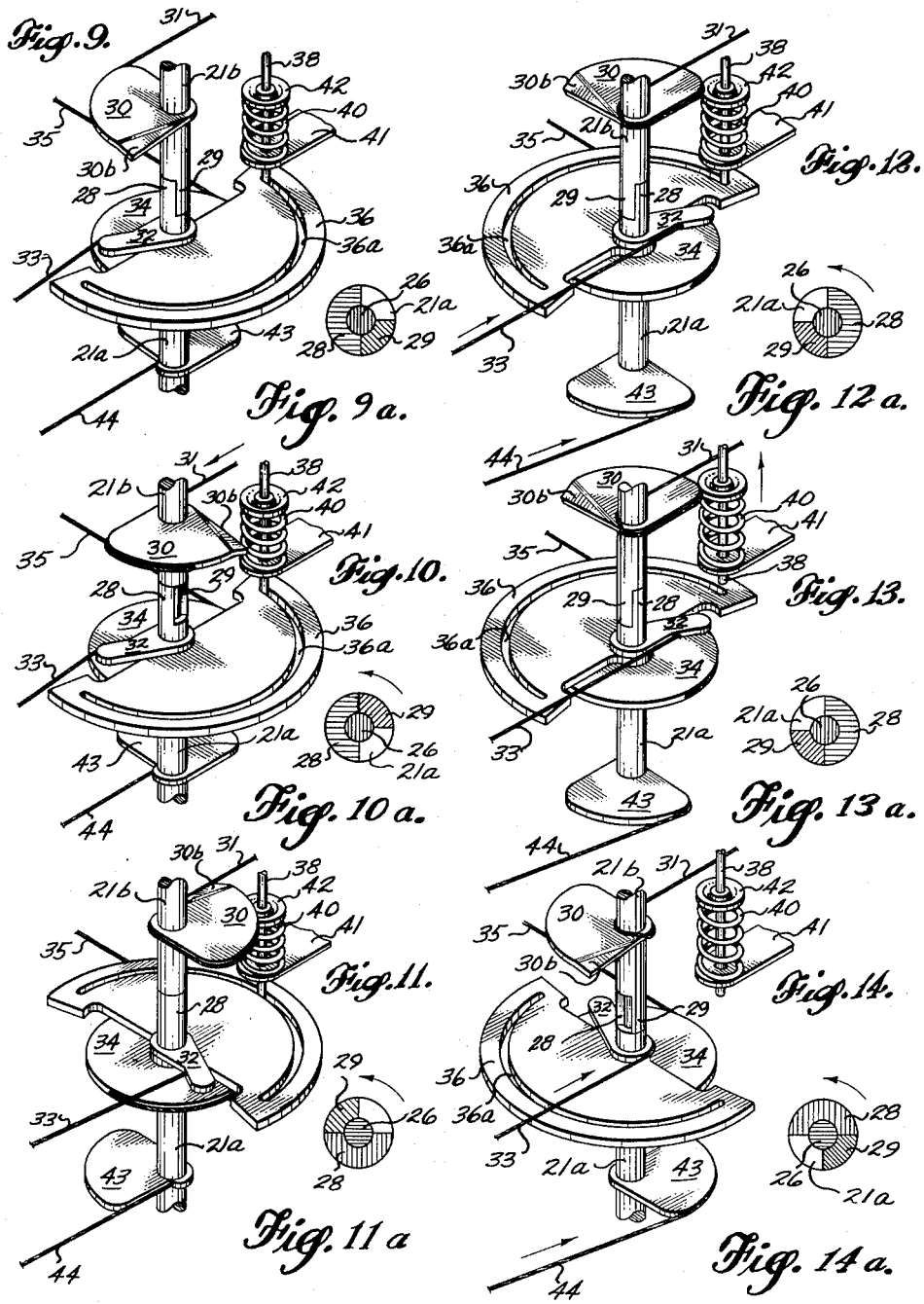

United States Patent Office 3,144,224
Patented Aug. 11, 1964

3,144,224
ESCAPE HATCHES FOR PASSENGER AIRLINER
Dee B. Carroll, 7332 38th St. NE., Seattle 15, Wash.
Filed Sept. 28, 1962, Ser. No. 226,909
13 Claims. (Cl. 244—129)

This invention relates to an emergency escape hatch for passenger airliners, and, more particularly, to an escape hatch having a passage between the dorsal portion of the fuselage and the ceiling of the passenger cabin which doubles as a storage compartment for an emergency flotation package and which may be opened from a plurality of stations.

Quite generally commercial airliners have escape hatches for emergency exit of the passengers located in the sides of the fuselage above the wing roots and adjacent to the empennage. Opening such cabin side hatches often admits fire and/or smoke when a forced landing occurs, as well as water when the airliner has been ditched. Further, the narrow aisle between adjacent rows of seats in the airliner is a source of considerable congestion requiring disciplined control of the passengers during emergency evacuation of the airliner.

The principal object of the present invention is to provide an escape hatch having a substantially vertical passage communicating between the ceiling of the passenger cabin and the dorsal portion of the airliner fuselage which is placed for convenient access by the passenger and which exposes the passenger cabin to the minimum ingress of fire, smoke and/or water.

Another specific object is the provision of an escape hatch or passage which doubles as a storage compartment for an emergency flotation package containing an inflatable life raft.

A further object of the present invention is stowing the emergency flotation package in a position in the compartment such that the inflating life raft will press against the lower door and the outer unlatched fuselage door, opening such outer door and ejecting the package and raft from the compartment.

To accomplish these objects the present invention also has as a special object the provision of a device which controls in sequence unlatching the fuselage door of the escape hatch prior to releasing the lower door, then inflating the life raft in the emergency flotation package enabling it to be ejected as mentioned above, and finally releasing the inner door latch.

Also, it is an important object of the present invention to enable the escape hatch to be opened from a plurality of stations and, in particular, from outside the airliner.

The safety of airline passengers can be improved and the foregoing objects accomplished by providing an aperture in the dorsal skin of an airliner fuselage which communicates with a similar aperture in the passenger cabin ceiling to form a passage through the top of the airliner. The fuselage aperture is closed by a door hinged to swing outward about its trailing edge. The ceiling aperture is closed by a separate door supported by its outboard edge to swing downward into the passenger cabin into a steeply inclined position. A ladder section is extendable from the ceiling door and cooperates with a ladder section on the door to form a ladder from the floor of the passenger cabin to the hatch. In its closed position the ceiling door forms a platform for supporting the emergency flotation package containing an inflatable life raft with gas inflation means. A sequence control insures that the life raft inflates and is ejected before the ceiling door is released to swing down into the passenger cabin.

FIGURE 1 is a transverse section of an airliner fuselage having two of the new escape hatches located side-by-side in the dorsal portion for purposes of illustration and showing one hatch in the open position and the other hatch in the closed position.

FIGURE 2 is a vertical longitudinal section through a part of the airliner fuselage taken on line 2—2 of FIGURE 1.

FIGURE 3 is a top perspective of a control mechanism with parts broken away.

FIGURES 4, 5, 6, 7 and 8 are simplified fragmentary top perspectives of the control mechanism showing sequential operations, and FIGURES 4a, 5a, 6a, 7a and 8a are corresponding transverse sections through the shaft joints.

FIGURES 9, 10, 11, 12, 13 and 14 are simplified fragmentary top perspectives of the control mechanism showing a different series of sequential operations, and FIGURES 9a, 10a, 11a, 12a, 13a and 14a are corresponding transverse sections through the shaft joints.

The general escape hatch structure illustrated in an airliner in FIGURES 1 and 2 comprises a substantially vertical passage 1 communicating between the ceiling of the passenger cabin and the top of the fuselage 2 closable by doors swingably mounted at both ends of the passage. Preferably the fuselage aperture is generally rectangular and located circumferentially in the fuselage skin adjacent to the dorsal stringer but offset from the longitudinal center of the fuselage to enable two escape hatches to be provided in side-by-side relationship at opposite sides of the fuselage central portion. A curved outer door 3, which is swingable about an axis perpendicular to the longitudinal axis of the airplane at its trailing edge 3a on spaced apart C-shaped hinge members 4, closes the fuselage aperture. Since the trailing edge of the door is arcuate the C-shaped hinge members are disposed transversely of the hinge axis with one end of each member fastened to the underside of the fuselage door and with the other end of the respective hinge members pivoted in the passage 1 on the fuselage structure adjacent to the aperture. This mounting effects upward movement of the trailing edge of the door relative to the fuselage skin to prevent binding when the curved door is swung outwardly from the fuselage.

A continuation of the top convex surface 3b of the fuselage door 3 forms a projecting flange 3c around its periphery which abuts against the fuselage skin contiguous to the rim of the fuselage aperture and prevents the door from swinging down into the passage. Placing gasket means between these abutting surfaces of the flange and fuselage skin will seal the passage from the elements when the door closes the fuselage aperture. A small stepped recess in the fuselage skin around the rim of the aperture for receiving the flange of the outer door will allow the door to fit flush with the fuselage skin, in which case a recessed handle 3d provides a gripping means for manually opening the door for inspection when it is unlatched.

Located directly beneath the fuselage aperture at the opposite end of the substantially vertical passage 1 is a similar rectangular aperture in the ceiling of the passenger cabin. Closing this ceiling aperture is an inner ceiling door 5 which is swingable about an axis parallel to the longitudinal axis of the fuselage, at its outboard edge remote from the longitudinal center of fuselage 2. Hinge members 6 located in the passage 1 swingably mount the ceiling door so that it swings down into the passenger cabin toward the side of the fuselage. A snubbing cylinder 7 to cushion downward swinging of the door is disposed transversely of the hinge axis of the ceiling door with one end pivotally fastened to the lower surface of the door and its opposite end fastened to the passenger cabin side. Such snubbing cylinder contains a stop limiting swinging of the ceiling door beyond a selected steeply inclined position.

When the ceiling door 5 is swung toward the cabin ceiling to close the aperture, a flange 8 projecting outwardly from the edges and coplanar with the bottom surface of the door prevents the door from swinging up into the passage 1. Since only the flange which is coplanar with the bottom surface of the door abuts against the cabin ceiling around the rim of the aperture, the door fits the aperture flush with the ceiling. A gasket between the door flange 8 and the rim of the aperture provides a positive seal.

One end of a ladder section 9 in the preferred embodiment of the escape hatch is pivotally mounted by rod 10 on the ceiling door 5 near its edge opposite its hinged edge. The pivot axis is parallel to the door's hinge axis and the pivot rod also forms the top rung of ladder section 9. The ladder section may be swung manually about the rod toward the door until it is in overlapping registry with the door and abuts its upper surface. When the ladder section is so disposed in overlapping registry it lies within the confines of the door's perimeter in which position the ladder will not interfere with closing of the door.

After the ceiling door 5 has been swung down into the passenger cabin the end of the ladder section 9 can be swung away from the door and into the passenger cabin until the lower ends of the ladder sidepieces 11 contact the cabin floor at a location to position the ladder generally parallel to the steeply inclined door. Since the ladder section only reaches from the floor to the lower edge of the door 5, a plurality of horizontal rungs 12 are mounted on the upper side of the door and spaced approximately equal to the rung spacing of ladder section 9 to form a continuous ladder from the floor of the cabin to the top of the fuselage. The rungs 12 are positioned so that, when the ladder member section 9 is folded alongside the door, the door rungs will project between the rungs and sidepieces of the ladder section. Disposition of the extension ladder section 9 and the door ladder section at a steep incline instead of vertical facilitates use of the ladder.

As shown in FIGURE 1, the passage 1, closed at its opposite ends by the ceiling door 5 and the fuselage door 3, respectively, forms an excellent compartment for storing an emergency flotation package 13, utilizing this otherwise waste space. When the aperture in the ceiling of the passenger cabin is closed by the door 5, the rungs and sidepieces of the ladder section 9 form a platform to support the emergency flotation package 13 containing an inflatable life raft and gas inflation means. Of course, such life raft must be cleared from the passage 1 prior to releasing the door 5 to prevent it from dropping down into the passenger cabin. To insure such clearing a special sequence control is provided.

Very generally, the sequence control first unlatches the fuselage hatch door 3, then activates the gas inflation means in the emergency flotation package 13, causing the life raft to inflate, inflation of the life raft propelling the package away from the ceiling door to be ejected out of the fuselage hatch door, and finally releasing the inner or ceiling door to swing open into the cabin. The inner door cannot be opened until after the raft has been inflated sufficiently to open the fuselage door 3, so that it is not possible for the raft to expand into the passenger cabin. The raft remains connected to the fuselage by a lanyard 14 which is uncoiled from a receptacle 15 in the passage 1 when the raft and package are ejected. Since one end of the lanyard is attached in the receptacle the lanyard may be provided with spaced knots and serve as an improvised ladder to the ground or water from the top of the airline as well as a tether for the raft.

The spindle assembly 20 is an integral part of the sequence control. The function of such assembly is to program the mechanical steps involved in unlatching the doors and inflating the life raft. This function in the preferred embodiment of the hatch installation is accomplished by differently scheduled winding of a plurality of cables on associated crank members projecting radially from the spindle 20. The control spindle includes two lengthwise aligned shafts 21a and 21b carrying a plurality of radially projecting cable engaging cranks shaped and located on the spindle shaft to effect such winding of associated cables. The spindle is disposed vertically in the dorsal portion of the fuselage adjacent to the centerline and spans between the ceiling of the passenger cabin and the exterior surface of the fuselage skin, being journaled near both ends in roller bearings 22 anchored in end plates 23 secured to the fuselage structure. The respective ends of the spindle extend beyond the end plates and project through holes in the crowns of bell-shaped housings 24 received in recesses in the cabin ceiling and the skin of the fuselage. A gasket seals each housing hole around the spindle shaft extending through it to prevent air pressure or water leakage.

Manipulating elements in the form of a circular or disc-shaped handle 25, having two parallel grooves 25a in its outer surface spaced apart to form a recessed gripping bar between them for turning the handle, is received in the mouth of each housing 24 and secured to the respective end of the spindle 20. These handles are flush with the exterior fuselage surface and the passenger cabin ceiling, respectively, and provides two stations from which the control spindle may be rotated manually by turning either handle. The outer handle, recessed in the exterior of the fuselage, is particularly important in rescue operations because it enables the doors to be unlatched from outside the airplane to provide emergency ingress for rescue crews.

The longer lower shaft 21a and the shorter upper shaft 21b are aligned and joined by a dowel 26 extending lengthwise of each shaft and having its ends received in blind holes in the adjacent shaft ends. Such shaft ends are scarfed to leave an upwardly protruding semicircular segment 28 on the upper end of lower shaft 21a and an overlapping downwardly protruding quarter segment 29 on the lower end of upper shaft 21b. Consequently, the upper shaft and the lower shaft can be rotated relatively a maximum of 90° before the sides of the protruding segments abut, thereby permitting lost motion between the two shafts. Such lost motion enables a change in the operation of the control spindle 20, when shaft 21b is rotated counterclockwise by its handle 25 in the fuselage as compared to using the handle on shaft 21a in the ceiling of the passenger cabin. One can, therefore, unlatch the fuselage hatch door 3 for inspection of the escape passage 1 without disturbing the position of the lower shaft.

Fixed on the upper shaft 21b of the control spindle 20 is a single cable crank 30, shown in FIGURE 3 as a quadrant sector with a groove 30a in its rim and its adjoining radial trailing edge. A cable 31 has one end fastened in the leading end of the arcuate groove and its opposite end is connected to the pin 17 of a spring closing pin latch 16 securing the fuselage hatch door 3 in the closed position. Pulling the cable withdraws the pin 17 from its associated reinforced aperture 18 opposing the pressure of the spring 19, thus unlatching the fuselage door. Only one pin latch 16 is shown for purposes of illustration but the fuselage hatch outer door could be secured by a plurality of such pin latches.

When the hatch doors are closed, cable 31 extends tangentially from the arcuate groove 30a of sector 30 to pulley means guiding it to the latch mechanism. When the spindle shaft 21b is turned 90° counterclockwise from the position of FIGURE 4 to that of FIGURE 5, the cable is wound in the grooved trailing edge of the sector. Comparing FIGURE 4 and FIGURE 5, it can be seen that during such rotation of shaft 21b cable 31 is pulled a substantial distance by turning of section 30. The cable is thus pulled sufficiently to unlock the fuselage cover and need not be pulled further thereafter. Consequently, on continued counterclockwise rotation, the cable is wound about the hub portion of the sector. A downward projecting lip or flange 30b on the leading edge of the crank sector wedges the cable out of registry with the groove in the sector shaft 21b as it is rotated beyond 180° counterclockwise to prevent the cable from being wound again on the sector as the rotation is thus continued.

Directly beneath the cable crank sector 30 but attached to lower shaft 21a of the spindle 20 is a radially projecting cable crank arm 32 having a groove 32a in its trailing edge from the spindle shaft to the end of the arm. Cable 33 has one end fastened in the central portion of the grooved trailing edge of the arm by a pin 32a.

This cable is connected to the gas inflation means of the life raft in the emergency flotation package 13 through appropriate pulley means. Pulling the cable activates the gas inflation means effecting inflation of the life raft. The expanding life raft is operable to propel the package and raft away from the support formed by the ceiling door and out of the passage 1 urging open the unlatched fuselage hatch door 3 in the process. When the control spindle 20 is in the doors closed or normal position, cable 33 extends to pulley means so that it is disposed in the groove in the trailing edge of the crank arm and is inclined beyond the end of the arm at approximately 135° to its trailing edge, as shown in FIGURES 3 and 4. When the lower spindle shaft 21a is rotated in a counterclockwise direction cable 33 at first is not pulled but is merely swung by the arm, as shown in FIGURE 5, until the spindle shaft 21a has been rotated more than 90°. During further rotation of the shaft from the position of FIGURE 5 to that of FIGURE 6 the cable will be pulled.

The next element below the cable crank arm 32 on the lower shaft 21a of the spindle 20 is a cable rotatable pulley 34. In the pulley rim is a groove 34a and one end of a cable 35 is fastened in the groove so that at least one turn of the cable is prewound in the groove in a counterclockwise direction. The cable 35 extends to the pilot compartment and when the cable is pulled it turns pulley 34, causing shaft 21a to rotate in a counterclockwise direction as the cable 35 is uncoiled from the groove. Thus cable 35 constitutes a further manipulating element enabling the sequence control to be operated from within the fuselage, in that case the pilot's compartment, for opening the escape hatch.

Located near the periphery and on the top surface of the pulley 34 is a member 36 having an arcuate slot 36a near its rim concentric with the axis of spindle 20 and which preferably is approximately 180° in extent. Such member is secured to the wheel by rivets 37. A rod 38 mounted vertically and parallel to the spindle 20 has one end located above member 36 and is reciprocable lengthwise downward for engagement of its lower end in the slot 36a. When the fuselage hatch door 3 is closed, a tab 39 on the door abuts the upper end of the rod and holds it down in opposition to the force of a compression spring 40 engaged between the rod mounting bracket 41 and a collar 42 fixed on the rod to retain the lower end of the rod engaged in the slot. Thus, as long as the fuselage hatch door is closed, the tab holds the rod engaged in the slot, preventing the spindle from rotating more than the arcuate extent of the slot 36a, at which time the end of the slot engages the rod end as a stop.

Also fixed to the lower shaft 21a of the spindle 20 beneath the pulley 34 is a cable crank quadrant sector 43. A groove 43a in the rim of such sector extends radially from the spindle shaft along the leading edge of the sector and then circumferentially of the sector to its trailing edge. Cable 44 attached to the hub of the sector is extended to pulley means so it is disposed radially of spindle 20, and the sector is secured to the shaft 21a in such angular relationship as to allow the shaft to rotate 90° counterclockwise from the starting position of FIGURE 6 before the cable is received in the groove in the radial edge of the sector. Continued counterclockwise rotation of the shaft carrying the sector lays the cable in the groove in the arcuate rim of sector.

Cable 44 passes from the hub of sector crank 43 around suitable guide pulley means and is attached to crank members 45 rotatable about pivots 45a and carrying latch pins 46 securing the ceiling hatch door 5 in the closed position. Pulling the cable withdraws the latch pins from their associated apertures in the edge of the door opposite the hinged edge. However, located directly above each latch pin of the ceiling door is a protruding stop 5b which engages the latch pin 46 immediately after the pin has been removed from its aperture and interrupts the downward swinging of the ceiling hatch door until the pin is further withdrawn. The pin thus holds the ceiling door up during the inflation period of the life raft. After the life raft has been expelled from the passage 1, the further withdrawal of the latch pin effected by winding of cable 44 on sector 43 will withdraw the pin from engagement with the protruding stop and allow the ceiling door to swing down into the passenger cabin. Conveniently the latch pins may be connected together by a spring-reciprocated rod 48 interconnecting the pivoted crank members 45 carrying the latch pins. The spring 48a is operable through the crank members to urge the latch pins into their respective apertures for latching the door 5 when the cable 44 is slack.

The effect of winding the respective cables on their associated cranks will be first described with reference to manually rotating the lower shaft 21a counterclockwise by its handle 25 located in the ceiling of the passenger cabin, or alternatively by pulling cable 35 which was prewound on pulley 34, since the operation of the spindle would be the same. FIGURES 4 to 8 show diagrammatic representations of the control spindle 20 moved through successive quarter or 90° increments of rotation and FIGURES 4a to 8a show corresponding positions of the overlapping segments on the respective abutting ends 28 and 29 of the two shafts 21a and 21b comprising the spindle 20. FIGURES 4 and 4a show the positions of the parts when both hatch doors are closed and the projecting segments 28 and 29 on the ends of the shafts 21a and 21b are abutting. If the lower shaft 21a is rotated in a counterclockwise direction the projections will remain in circumferential abutment, as shown in FIGURES 4a to 8a, so that the operation is the same as though the spindle were composed of a continuous solid shaft.

During the first 90° of counterclockwise rotation of the spindle 20 from the position of FIGURES 4 and 4a when operated from within the airliner cabin by turning a handle 25, rotation of sector 30 pulls cable 31 by winding it on the cable crank sector to release the latch of fuselage door 3. During such first quarter turn cable 33 is not pulled, because of its inclination to arm 32 and its attachment to the central portion of the trailing edge of such arm. Also, since cable 44 is attached to the hub of cable crank sector 43 and extends perpendicular to the grooved leading edge of the sector in the position of FIGURE 4, it is not wound on such sector when the control spindle is rotated 90° in a counterclockwise director to the position of FIGURE 5, as this merely turns the leading edge of the sector into a position alongside the cable.

By continuing counterclockwise rotation of the spindle 20, through another quarter turn, from the position of FIGURES 5 and 5a to the position of FIGURES 6 and 6a, both cables 33 and 44 are pulled by arm 32 and sector 43, respectively. Since cable 31 during the second quarter turn of the spindle is wound about the hub instead of about the periphery of its cable cranking sector 30, such cable is only pulled slightly farther, it having already been pulled sufficiently to accomplish its purpose of unlatching the fuselage hatch door 3. Such pulling of cable 33 initiates inflation of the life raft and pulling of cable 44 effects the initial opening movement of the cabin ceiling door 5 as described above. As the raft is inflated it can easily push open the fuselage hatch door 3 and cause the package to be expelled from the passage between the respective hatch doors.

Referring to FIGURE 6, the end of the rod 38 engaged in the arcuate slot 36a, which was engaged in the leading end of the slot when the control spindle 20 was in its initial position of FIGURES 4 and 4a, by the half turn of the spindle is abutted by the trailing end of the slot, preventing further turning of the control spindle. However, when the fuselage hatch door 3 is urged open by the inflating life raft, the tab 39 abutting the end of rod 38 is raised, allowing the compression spring 40 to lift the rod out of engagement in the slot, as shown in FIGURE 7, so that the spindle can continue to be rotated in a counterclockwise direction beyond the position of FIGURES 6 and 6a.

When the inner handle 25 is turned a further quarter turn, the spindle then having been turned 270° from the position of FIGURES 4 and 4a to the position shown in FIGURES 8 and 8a, downward projecting flange 30b on the leading edge of the cable cranking sector 30 lifts cable 31 out of registry with the sector rim, causing it to be wound on shaft 21b rather than on the cranking sector to reduce the length of this cable pulled by such further spindle rotation, since the latch 16 securing the fuselage door was released by the first 90° of spindle rotation. Also cable 33 is pulled only slightly farther, being wound on the hub of crank arm 32 by this further rotation, having completed its function of actuating the gas inflation means of the life raft. Cable 44, however, is pulled a substantial additional distance by being wound in the arcuate groove in the periphery of cable crank sector 43 to swing lever 45 for withdrawing the latch pin 46 from stop 5b to release the ceiling door 5 for downward swinging into the passenger cabin to provide a continuous ladder from the passenger cabin floor between adjacent rows of seats to the hatch opening.

FIGURES 9 to 14 and 9a to 14a illustrate successive positions of the control spindle 20 for 90° increments of rotation effected by turning handle 25 located in the fuselage skin to turn shaft 21b counterclockwise from the position of FIGURES 9 and 9a to open the hatch. In FIGURES 9 and 9a the control spindle 20 is shown in the same initial position as in FIGURES 4 and 4a. Because segment 29 has an arcuate extent of 90° while the lower shaft segment 28 is 180° in arcuate extent, the upper shaft 21b can be rotated by its handle 25 through 90° relative to the lower shaft 21a about the dowel 26 joining the shafts before the quarter segment 29 of the upper shaft abuts the opposite end of the semicircular segment 28 on the upper end.

Since this first 90° increment of rotation of the upper shaft 21b, when turned by the upper control handle 25 recessed in the exterior of the fuselage, is not transmitted to the lower shaft, only the cable cranking sector 30 carried by the upper shaft is turned while the lower shaft 21a and the arm 32 and sector 43 mounted on it remain stationary. Pulling of cable 31 by such turning of sector 30 is operable to withdraw the latch pins 17 from latches 16, as previously discussed, releasing the outer hatch door 3.

The door can then be pulled open manually by grasping the recessed gripping means 3d in the outer surface of the door without actuating any of the other components controlled by spindle 20. Passage 1 and its contents can, therefore, be inspected periodically without otherwise operating the sequence controlling mechanism for the escape hatch. After the maintenance or inspection has been completed, the door can be closed and the outer handle 25 returned clockwise to the door-latching position, allowing the spring 19 to urge the pin 17 into the pin aperture 18, securing the fuselage door.

Further counterclockwise rotation of the control spindle 20, beyond 90° of counterclockwise rotation by the outer handle 25, shown in FIGURES 10 and 10a, will cause the sequence controlling spindle to function as previously described when using the inner handle on the lower end of shaft 21a or pulling the cable 35 at the remote station in the pilot's compartment, except that the cable cranking sector 30 is advanced 90° in the director of rotation beyond the other cable cranking members on the lower shaft 21a of the control spindle. Compare FIGURE 11 with FIGURE 5, FIGURE 12 with FIGURE 6, FIGURE 13 with FIGURE 7 and FIGURE 14 with FIGURE 8. Thus the complete sequence requires that the outer handle in the fuselage be turned 360° to open the inner door 5 as compared with the 270° of rotation of the inner handle which will open such door.

To be able to open the emergency escape device from outside the aircraft for emergency ingress in rescue situations is important, but a person manipulating the outer handle in the fuselage must be careful to keep clear of the fuselage door 3 when the inflating life raft opens the fuselage door and propels the package 13 out of the passage. Trained rescue crews could, however, manually open the fuselage door, disconnect the gas inflation means from the life raft and thereafter lift the package out of the passage to avoid inflation of the life raft and eliminate the danger of injury from the emergency flotation package being propelled out of the passage by the inflating life raft.

Provision of a life raft package in the passage 1 is of value only for airplanes operating over water. An escape hatch in the upper portion of an airplane cabin which can be opened either from the inside or from the outside of an airplane may be very useful even for emergency landings on the ground as has been mentioned above. Where the life raft package is not provided, however, it is not necessary to prevent the inner door being opened until after the life raft has been inflated. Where no life raft package is provided, therefore, the latch rod 38, collar 42 and associated spring 40 can simply be omitted from the assembly. The inner handle may then be turned to rotate shaft 21a without interruption from the position of FIGURE 5 through the position of FIGURE 6 to the position of FIGURE 7, or the outer handle can be turned to move shaft 21b and 21a from the position of FIGURE 11 through the position of FIGURE 12 to the position of FIGURE 14, without interruption. The sequence control mechanism in such case will operate as described above, first, to unlatch the outer door 3 and subsequently, to unlatch the inner door 5.

I claim as my invention:

1. An airliner fuselage escape hatch structure comprising a passage between the fuselage passenger cabin ceiling and the dorsal portion of the fuselage, an upper door closing the outer end of said passage, a lower door closing the inner end of said passage, and common operating means operatively connected to both of said doors to effect opening of said two doors and including two manipulating elements on opposite sides of said two doors, respectively, one of said manipulating elements being operable from within the fuselage to effect movement of said operating means to open both of said doors and the other of said manipulating elements being operable from the exterior of the airliner to effect movement of said operating means to open both of said doors.

2. The airliner fuselage escape hatch structure defined in claim 1, and sequence control means operatively connected to the common operating means and operable to effect movement of the operating means to release the upper door for opening prior to movement of the operating means to open the lower door.

3. The airliner fuselage escape hatch structure defined in claim 2, and means controlled by the upper door and operatively connected to the common operating means to prevent operation thereof to open the lower door prior to opening of the upper door.

4. The airliner fuselage escape hatch structure defined in claim 1, in which the operating means includes lost motion means in the common operating means interposed between the manipulating element operable from within the fuselage and the manipulating element operable from the exterior of the airliner enabling movement of the manipulating element operable from the exterior of the airliner independently of movement of the manipulating element operable from within the fuselage to release the upper door for opening without effecting movement of the manipulating element operable from within the fuselage.

5. The airliner fuselage escape hatch structure defined in claim 1, and inflatable life raft means received within the passage and operable by inflation thereof to push open the upper door when it is released.

6. The airliner fuselage escape hatch structure defined in claim 4, in which the lost motion means includes two longitudinally aligned shaft elements, one of said shaft elements being connected to the manipulating element operable from within the fuselage and the other of said shaft elements being connected to the manipulating element operable from the exterior of the airliner, the adjacent ends of said two shaft elements having overlapping segments and the segment on the end of the shaft element connected to the means operable from within the fuselage being of a greater arcuate extent than that of the segment on the shaft element connected to the means operable from the exterior of the airliner, the arcuate extent of such segments together constituting less than 360°.

7. The airliner fuselage escape hatch structure defined in claim 6, in which the segment on the end of the shaft element connected to the manipulating element operable from within the fuselage is approximately a semi-circle in arcuate extent and the segment on the shaft element connected to the manipulating element operable from the exterior of the airliner is approximately a quarter circle in arcuate extent.

8. An airliner fuselage escape hatch structure comprising a passage between the fuselage passenger cabin ceiling and the dorsal portion of the fuselage, an upper door closing the outer end of said passage, a lower door closing the inner end of said passage, a life raft stored in said passage between said doors, operating means operable to effect opening of said two doors, ladder means above said lower door, and means supporting said ladder means for movement downward from the inner end of said passage to enable passengers in the passenger cabin to ascend said ladder means for egress from the fuselage passenger cabin through said passage after removal of said life raft therefrom.

9. An airliner fuselage escape hatch structure comprising a passage between the fuselage passenger cabin ceiling and the dorsal portion of the fuselage, an upper door closing the outer end of said passage, a lower door closing the inner end of said passage, an inflatable life raft stored in deflated condition in said passage and expandable by inflation to push against said upper door, latch means normally holding said upper door in closed position and releasable for opening of said upper door by pressure of said inflated life raft against it, lower door means normally holding said lower door in closed position and operable to release said lower door for opening, and central means preventing door releasing movement of said lower door means while said uper door is closed and released by opening of said upper door effected by inflation of said life raft for lower door releasing movement of said lower door means.

10. The airliner fuselage escape hatch structure defined in claim 9, in which the life raft is supported by the lower door and is of a vertical extent when it is inflated greater than the vertical extent of the passage, for pushing the upper door open by the inflating life raft reacting from the lower door.

11. An airliner fuselage escape hatch structure, comprising a passage communicating between the fuselage passenger cabin ceiling and the dorsal portion of the fuselage, an upper door closing the outer end of said passage and swingable outward away from the fuselage about its trailing edge, a lower door closing the inner end of said passage and swingable downward into the passenger cabin about one edge remote from the longitudinal axis of the fuselage, a flotation package having an inflatable life raft and gas inflation means to effect inflation of said life raft, said package being stowed for distension of said raft away from said lower door for pushing open said upper door and ejecting said raft and such package from said passage, and operating means to effect, in sequence, release of said upper door to swing outward, then inflation of said life raft and finally release of said lower door to swing inward.

12. The escape hatch structure defined in claim 11, in which the operating means includes a spindle having a plurality of radially projecting cranking members secured thereon, said spindle being disposed vertically adjacent to the passage, handle members on the respective opposite ends of said spindle to effect rotation thereof, and the operating means including connecting cables fastened to said cable cranking members and positioned to effect such operation in sequence by winding of said cables on said cable cranking members.

13. An airliner fuselage escape hatch structure comprising a passage between the fuselage passenger cabin ceiling and the dorsal portion of the fueselage, an upper door closing the outer end of said passage, a lower door closing the inner end of said passage, latch means normally holding said upper door in closed position and releasable for opening of said upper door, lower door means normally holding said lower door in closed position and operable to release said lower door for opening, and control means preventing door releasing movement of said lower door means while said upper door is closed and released by opening of said upper door for lower door releasing movement of said lower door means.

References Cited in the file of this patent

UNITED STATES PATENTS

| | | |
|---|---|---|
| 2,114,301 | Harrigan | Apr. 19, 1938 |
| 2,444,264 | Morris | June 29, 1948 |
| 2,455,157 | Bigelow | Nov. 30, 1948 |
| 2,558,975 | Moreno | July 3, 1951 |
| 2,926,012 | Maher | Feb. 23, 1960 |

FOREIGN PATENTS

| | | |
|---|---|---|
| 21,870 | Great Britain | 1910 |
| 575,062 | Great Britain | Feb. 1, 1946 |